US008439538B2

(12) United States Patent
Hatta

(10) Patent No.: US 8,439,538 B2
(45) Date of Patent: May 14, 2013

(54) VEHICLE LIGHT

(75) Inventor: Sadaharu Hatta, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 102 days.

(21) Appl. No.: 13/082,049

(22) Filed: Apr. 7, 2011

(65) Prior Publication Data

US 2011/0249459 A1 Oct. 13, 2011

(30) Foreign Application Priority Data

Apr. 7, 2010 (JP) ................................. 2010-088843

(51) Int. Cl.
*F21V 7/00* (2006.01)
*F21V 29/00* (2006.01)
*B60Q 1/00* (2006.01)

(52) U.S. Cl.
USPC ........... 362/517; 362/545; 362/547; 362/294; 362/373

(58) Field of Classification Search .................. 362/516, 362/517, 544, 545, 547, 237, 240, 241, 247, 362/249.02, 294, 373, 297, 346, 345
See application file for complete search history.

(56) References Cited

U.S. PATENT DOCUMENTS

| | | | | |
|---|---|---|---|---|
| 6,682,211 | B2 * | 1/2004 | English et al. | 362/545 |
| 6,805,474 | B2 * | 10/2004 | Walser et al. | 362/494 |
| 7,111,971 | B2 * | 9/2006 | Coushaine et al. | 362/545 |
| 7,150,553 | B2 * | 12/2006 | English et al. | 362/545 |
| 7,234,844 | B2 * | 6/2007 | Bolta et al. | 362/294 |
| 2004/0037088 | A1 * | 2/2004 | English et al. | 362/545 |

FOREIGN PATENT DOCUMENTS

JP 2009-217937 A 9/2009

* cited by examiner

*Primary Examiner* — Thomas Sember
(74) *Attorney, Agent, or Firm* — Kenealy Vaidya LLP

(57) ABSTRACT

A vehicle light can achieve the same or similar heat dissipation performance as that of a conventional vehicle light while having a smaller height than that of the conventional vehicle light, thereby improving space utilization efficiency for a limited installation space of a vehicle body. The vehicle light can include a housing, a cover lens attached to the housing to define a lighting chamber between itself and the housing. A heat dissipation member can be attached to the housing. An optical system can be disposed within the lighting chamber. The optical system can include a heat conduction member including an LED attached surface and a support member fixed to the LED attached surface at one end thereof and to the housing or the heat dissipation member at the other end thereof. An LED light source can be attached to the LED attached surface, and a reflector can be provided for receiving and reflecting light emitted from the LED light source towards the cover lens so that the reflected light passing through the cover lens forms a predetermined light distribution pattern.

12 Claims, 6 Drawing Sheets

VEHICLE LIGHT

This application claims the priority benefit under 35 U.S.C. §119 of Japanese Patent Application No. 2010-088843 filed on Apr. 7, 2010, which is hereby incorporated in its entirety by reference.

TECHNICAL FIELD

The presently disclosed subject matter relates to a vehicle light, and in particular, to a vehicle light utilizing an LED light source.

BACKGROUND ART

In conventional vehicle lights, a heat sink has been utilized to dissipate heat generated by the light emission of an LED light source. Japanese Patent Application Laid-Open No. 2009-217937 discloses such a vehicle light 200 as shown in FIGS. 1A and 1B. The vehicle light 200 can include an LED mounting substrate 210, and a structure 220 having an LED attached surface 221 and a heat sink 222 disposed below the LED attached surface 221. An LED light source 211 is mounted on the LED mounting substrate 210. When the LED light source 211 is turned on to emit light, heat is also generated and then propagated to the heat sink 222 so that the heat is dissipated into air via the heat sink 222.

If a pair of the structures 220 is utilized to form an integrated vehicle light with the LED light sources 221 (LED attached surfaces 221) being opposite to each other as shown in FIG. 2, the heat sinks 222 extend upward and downward in the vertical direction, thereby increasing the entire height H of the integrated vehicle light. Accordingly, such a vehicle light may not be suitable for a limited installation space of a vehicle body.

SUMMARY

The presently disclosed subject matter was devised in view of these and other problems and features and in association with the conventional art. According to an aspect of the presently disclosed subject matter, a vehicle light can provide a smaller height when compared with conventional vehicle lights while the vehicle light can achieve the same or similar heat dissipation performance as that of conventional vehicle lights. Accordingly, the vehicle light can effectively utilize a limited installation space of a vehicle body.

According to another aspect of the presently disclosed subject matter, a vehicle light can include: a housing; a cover lens attached to the housing to define a lighting chamber between itself and the housing; a heat dissipation member attached to the housing; and an optical system disposed within the lighting chamber. The optical system can include a heat conduction member including an LED attached surface and a support member fixed to the LED attached surface at one end thereof and to the housing or the heat dissipation member at the other end thereof, an LED light source attached to the LED attached surface, and a reflector for receiving and reflecting light emitted from the LED light source to the cover lens so that the reflected light passing through the cover lens forms a predetermined light distribution pattern.

In the vehicle light with the above configuration, the heat generated by the turned-on LED light source can propagate to the housing or the heat dissipation member by the action of the support member fixed to the LED attached surface at the one end thereof (meaning that the one end of the support member is connected with the light emission side of the LED light source). Accordingly, the heat can be effectively dissipated into air at the housing or the heat dissipation member. In this way, the vehicle light can achieve the same or similar heat dissipation performance as that of the conventional vehicle lights by the action of the support member, and heat sinks and the like member of the conventional vehicle light can be omitted. Furthermore, the vehicle light with the above configuration can have a smaller height than that of the above-described conventional vehicle light by the height of the omitted heat sink even when the vehicle light can be configured to have a pair of optical systems that is arranged so that the LED light sources are opposite to each other. This configuration can improve space utilization efficiency.

Accordingly, the vehicle light with the above configuration can achieve both the same or similar heat dissipation performance as that of the conventional vehicle light and can have a smaller height to improve the space utilization efficiency.

According to still another aspect of the presently disclosed subject matter, a vehicle light can include: a housing; a cover lens attached to the housing to define a lighting chamber between itself and the housing, the lighting chamber including a first space and a second space; a heat dissipation member attached to the housing; a first optical system disposed within the first space of the lighting chamber; and a second optical system disposed within the second space of the lighting chamber. The first optical system can include a first heat conduction member including a first LED attached surface disposed to be directed in a direction toward the second space and a first support member fixed to the first LED attached surface at one end thereof and to the housing or the heat dissipation member at the other end thereof, a first LED light source attached to the first LED attached surface so as to be directed in the direction toward the second space, and a first reflector disposed in an illumination direction of the first LED light for receiving and reflecting light emitted from the first LED light source to the cover lens so that the reflected light passing through the cover lens forms a predetermined light distribution pattern. The second optical system can include a second heat conduction member including a second LED attached surface disposed to be directed in a direction toward the first space and a second support member fixed to the second LED attached surface at one end thereof and to the housing or the heat dissipation member at the other end thereof, a second LED light source attached to the second LED attached surface so as to be directed in the direction toward the first space, and a second reflector disposed in an illumination direction of the first LED light source for receiving and reflecting light emitted from the second LED light source to the cover lens so that the reflected light passing through the cover lens forms a predetermined light distribution pattern.

In the vehicle light with the above configuration, the heat generated by the turned-on first LED light source can be transferred to the housing or the heat dissipation member by the action of the first support member fixed to the first LED attached surface at the one end thereof (meaning that the one end of the first support member is connected with the light emission side of the first LED light source). Accordingly, the heat can be effectively dissipated into air at the housing or the heat dissipation member. Similarly, the heat generated by the turned-on second LED light source can be transferred to the housing or the heat dissipation member by the action of the second support member fixed to the second LED attached surface at the one end thereof (meaning that the one end of the second support member is connected with the light emission side of the second LED light source). Accordingly, the heat can be effectively dissipated into air at the housing or the heat dissipation member. In this way, the vehicle light can achieve the same or improved heat dissipation performance as that of the conventional vehicle light by the action of the first and second support members, and heat sinks and the like member of the conventional vehicle light may be omitted as appropriate. Furthermore, the vehicle light with the above configuration can have a smaller height than that of the conventional vehicle light by the height of the omitted heat sink. This configuration can improve the space utilization efficiency.

Accordingly, the vehicle light with the above configuration can achieve both the same or similar heat dissipation performance as that of the conventional vehicle light and can have a smaller height to improve the space utilization efficiency.

In the vehicle light with the above configuration, the lighting chamber can be divided into an upper space and a lower space and the upper space corresponds to the first space and the lower area corresponds to the second area.

In the vehicle light with the above configuration, the first reflector can be configured to reflect light emitted from the first LED light source to the cover lens so that the reflected light passing through the cover lens forms any of a high beam light distribution pattern and a low beam light distribution pattern, and the second reflector can be configured to reflect light emitted from the second LED light source to the cover lens so that the reflected light passing through the cover lens forms any of a high beam light distribution pattern and a low beam light distribution pattern.

The vehicle light with the above configuration can provide any of a high beam light distribution pattern and a low beam light distribution pattern with a smaller height structure.

In the vehicle light with the above configuration, the first LED light source and the second LED light source can be controlled so as not to be simultaneously turned on.

If the above control is performed, the amount of heat generated by turning on any one of the first and second LED light sources can be suppressed to about half the amount of heat generated when both the first and second LED light sources are simultaneously turned on. Accordingly, the heat dissipation member (such as a heat dissipation fin) can be decreased in size.

As described above, the vehicle light with the above configuration can achieve the same or similar heat dissipation performance as that of the conventional vehicle light while having a smaller height than that of the above-described conventional vehicle light, thereby improving the space utilization efficiency for the limited installation space of a vehicle body.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to exemplary vehicle lights of the presently disclosed subject matter with reference to the accompanying drawings in accordance with exemplary embodiments.

Figure 1A:
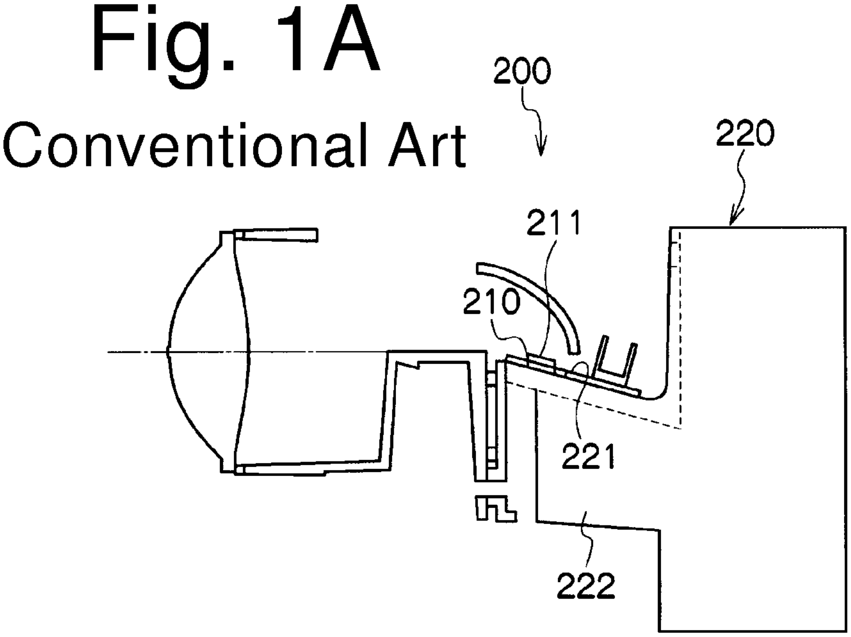
Fig. 1A Conventional Art
FIG. 1A is a cross sectional view of a conventional vehicle light and FIG. 1B is a perspective view of a structure of the vehicle light with a heat sink.
Figure 1B:
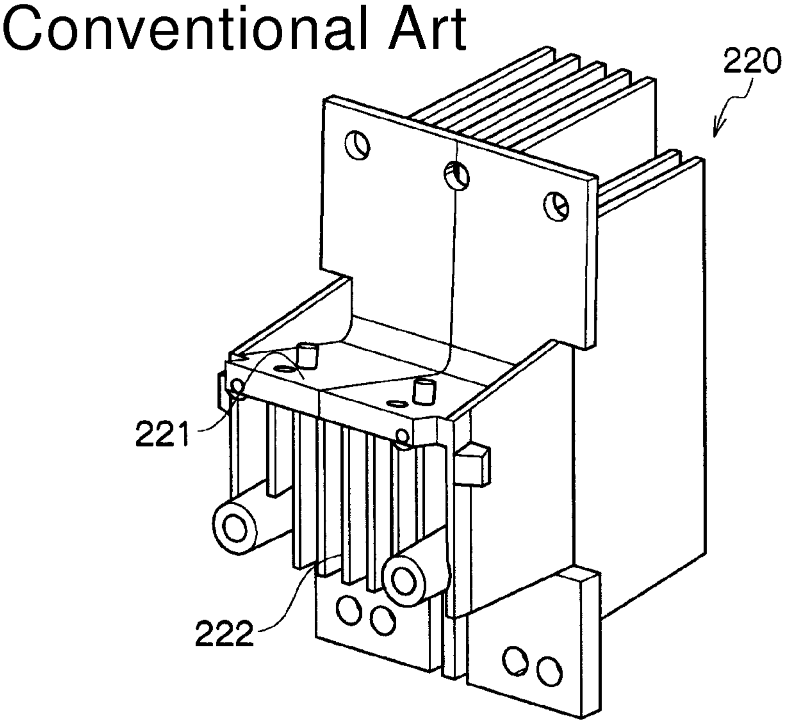
Fig. 1B Conventional Art
Figure 2:
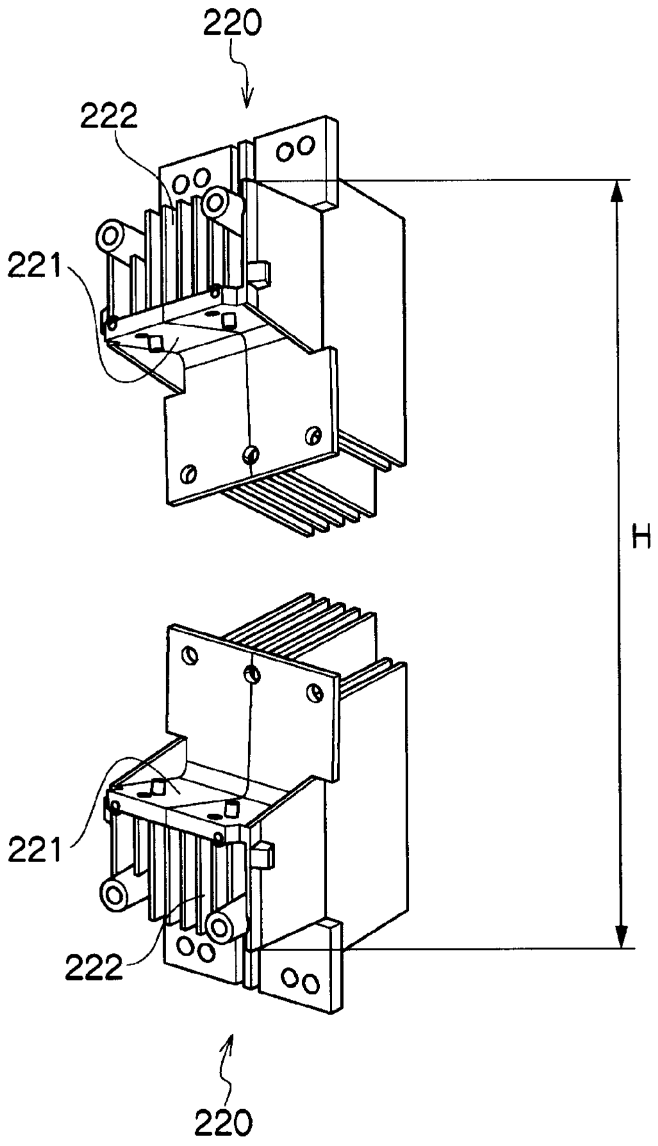
Fig. 2 Conventional Art
FIG. 2 is a perspective view of a structure of integrated vehicle lights with a heat sink before assembling, for illustrating a problem in association with the conventional vehicle light.
Figure 3:
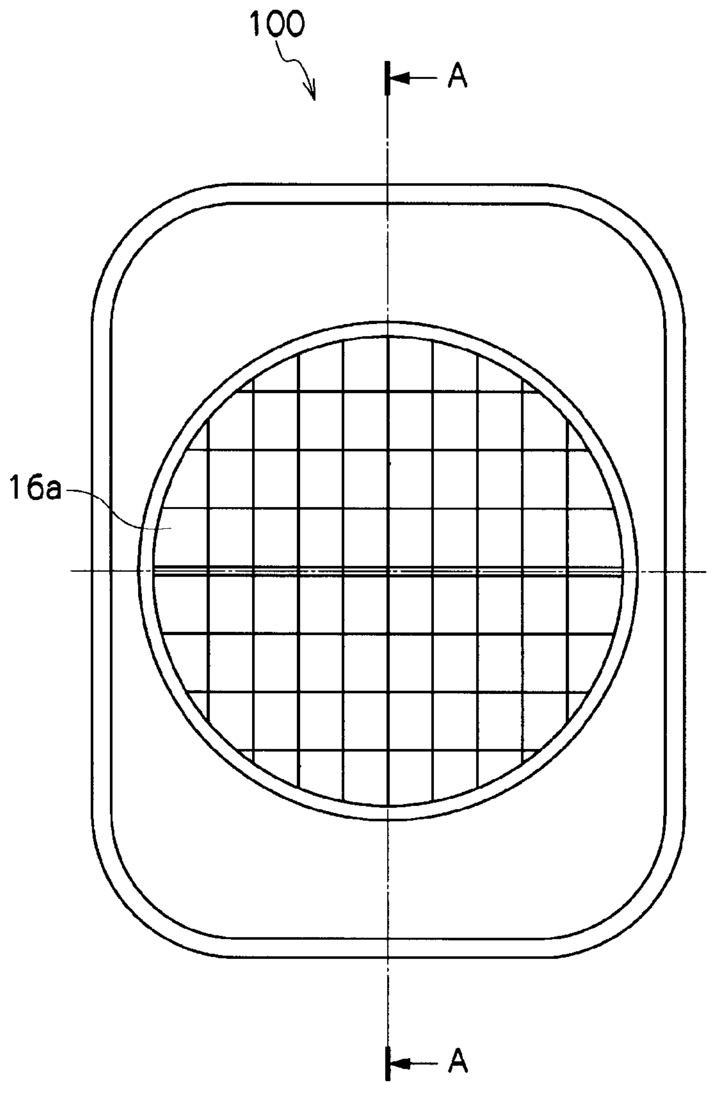
FIG. 3 is a front view of an exemplary vehicle light made in accordance with principles of the presently disclosed subject matter.
Figure 4:
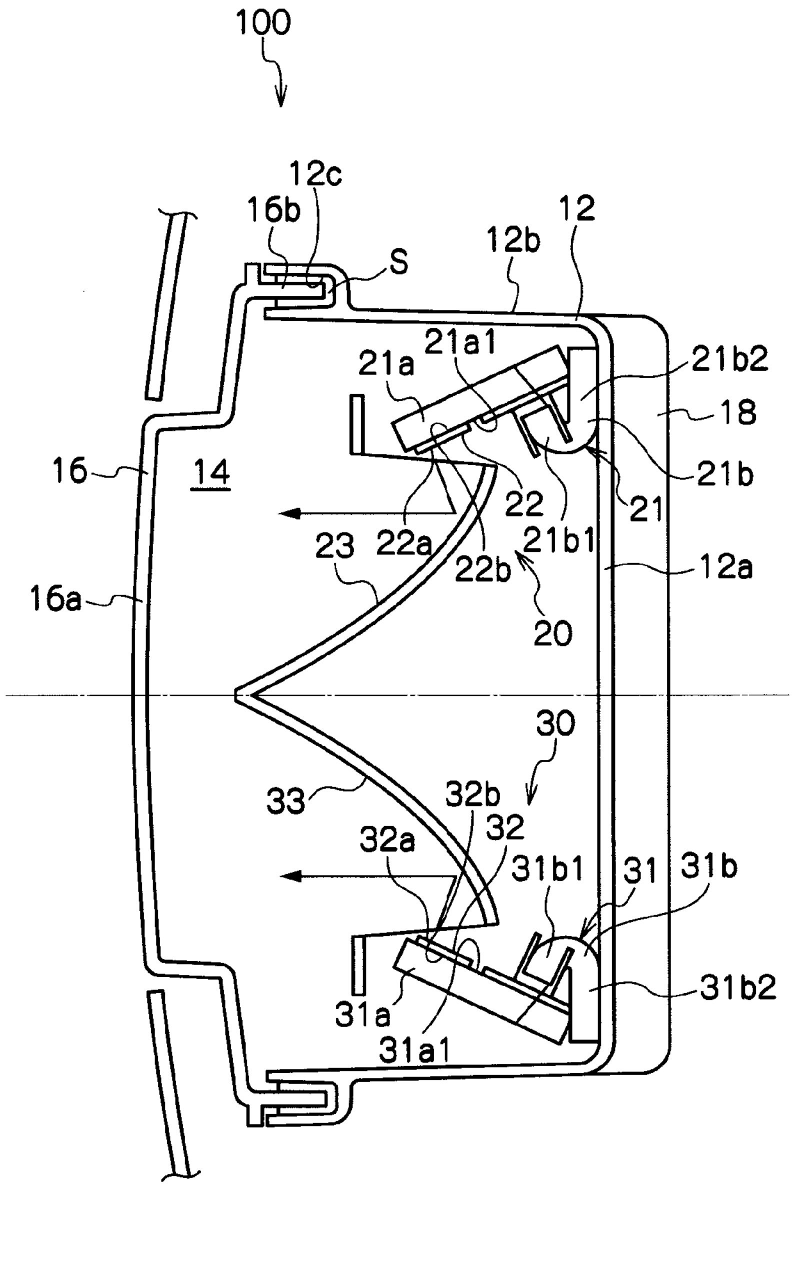
FIG. 4 is a cross sectional view of the vehicle light taken along line A-A of FIG. 3.

An exemplary vehicle light 100 made in accordance with principles of the presently disclosed subject matter can be applied to a vehicle headlamp, a signal light, and the like for an automobile, a truck, and SUV, a motorcycle, and the like. As shown in FIGS. 3 and 4, the vehicle light 100 can include: a housing 12; a cover lens 16 attached to the housing 12 to define a lighting chamber 14 between itself and the housing 12, the lighting chamber 14 being approximately divided into a first space and a second space (in the illustrated example, an upper space and a lower space); a heat dissipation member 18 attached to the housing 12; a first optical system 20 disposed within the first space of the lighting chamber 14; and a second optical system 30 disposed within the second space of the lighting chamber 14. It should be understood that in the illustrated example the first optical system is an upper optical system and the second optical system is a lower optical system, which is not limitative. The vehicle light may be disposed horizontally so that the first optical system can be a right optical system and the second optical system can be a left optical system. Hereinafter, in order to facilitate the understanding with reference to the drawings, the first optical system may be referred to as the "upper optical system" and the second optical system as the "lower optical system." An overall optical axis of the vehicle light 100 can extend normal from a substantial center of the cover lens 16, as shown in FIG. 4, and can be located substantially between the first optical system and second optical system.

The housing 12 can include a recessed end portion 12*a* disposed on a deeper side in a vehicle body (not shown) and a cylindrical wall portion 12*b* extending from the peripheral edge of the end portion 12*a* to the front side of the vehicle body. An annular grooved portion 12*c* can be formed at the cylindrical end of the wall portion 12*b*. The cover lens 16 can include a leg portion 16*b* that is to be inserted into the annular grooved portion 12*c*. The housing may be formed from a metal material such as aluminum, or a synthetic resin material, for example.

The heat dissipation member 18 such as a heat dissipation fin can be attached to the housing 12, for example, to the outer surface of the end portion 12*a* of the housing 12.

The cover lens 16 can include a lens portion 16*a* and the annular leg portion 16*b* extending from the periphery of the lens portion 16*a*. The cover lens 16 can be formed from a light transmitting material such as an acrylic resin, a polycarbonate resin, and the like.

The cover lens 16 can be attached to the housing 12 by inserting the annular leg portion 16*b* of the cover lens 16 into the annular grooved portion 12*c* of the housing 12 via a sealing material S or the like, so that a lighting chamber 14 can be defined by the cover lens 16 and the housing 12.

As shown in FIG. 4, the upper optical system 20 can include a first heat conduction member 21, a first LED mounting substrate 22, a first reflector 23, and the like.

Figure 5:
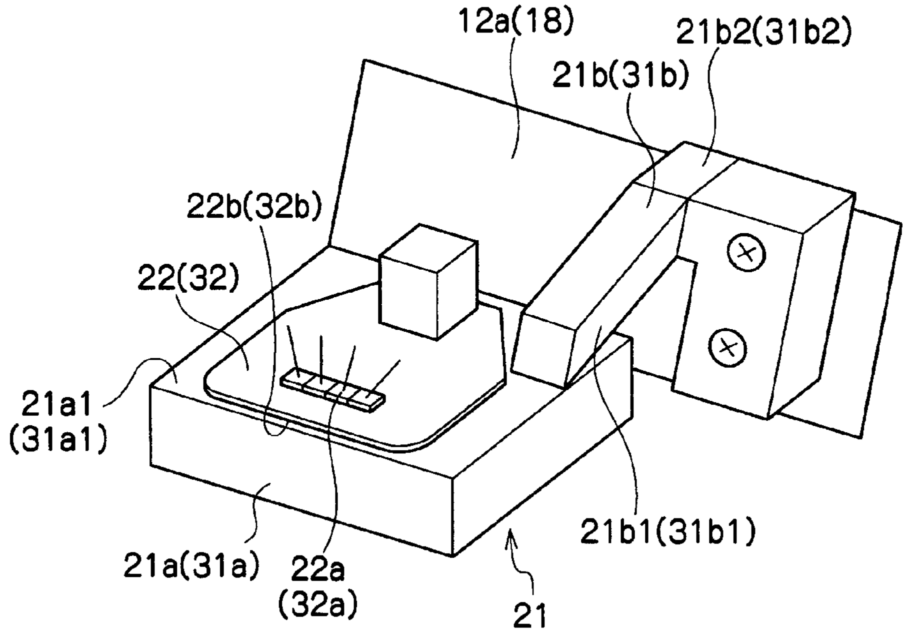
FIG. 5 is an enlarged perspective view of a first heat conduction member (equivalent to a second heat conduction member) of the vehicle light of FIG. 3.

As shown in FIGS. 4 and 5, the first heat conduction member 21 can include a seating member 21*a* having a planar first LED attached surface 21*a*1 disposed to face downward in the vertical direction, and a first support member 21*b* fixed to the first LED attached surface 21*a*1 at one end 21*b*1 thereof and fixed by screwing to the housing 12 (to the end portion 12*a* of the housing 12) or the heat dissipation member 18 at the other end 21*b*2 thereof. It should be noted that the seating member 21*a* can be disposed while inclined rearward in order for the first LED light source 22*a* to be prevented from being observed from the front side of the vehicle light 100. The first heat conduction member 21 can be formed from a metal material having a relatively high heat conductivity, such as aluminum.

The first LED mounting substrate 22 can be a substrate for allowing the first LED light source 22*a* to be mounted on one surface thereof. The first LED mounting substrate 22 can be fixed by screwing to the first LED attached surface 21*a*1 of the seating portion 21*a* while the rear side 22*b* of the substrate 22 opposite to the side where the first LED light source 22*a* is mounted faces to or comes in contact with the first LED attached surface 21*a*1.

The first reflector 23 can be disposed in the illumination direction of the first LED light source 22*a* so as to reflect light emitted from the first LED light source 22*a*. With the configuration of the first reflector 23, the reflected light can pass through the lens portion 16*a* of the cover lens 16 so that a predetermined light distribution pattern such as a high beam light distribution pattern can be formed. The first reflector 23 can be a revolved parabolic reflector with its focus located at or near the first LED light source 22*a*, for example.

As shown in FIG. 4, the lower optical system 30 can include a second heat conduction member 31, a second LED mounting substrate 32, a second reflector 33, and the like.

As shown in FIGS. 4 and 5, the second heat conduction member 31 can include a seating member 31*a* having a planar second LED attached surface 31*a*1 disposed to face upward in the vertical direction, and a second support member 31*b* fixed to the second LED attached surface 31*a*1 at one end 31*b*1 thereof and fixed by screwing to the housing 12 (to the end portion 12*a* of the housing 12) or the heat dissipation member 18 at the other end 31*b*2 thereof. It should be noted that the seating member 31*a* can be disposed while inclined rearward in order for the second LED light source 32*a* to be prevented from being observed from the front side of the vehicle light 100. The second heat conduction member 31 can be formed from a metal material having a relatively high heat conductivity, such as aluminum.

The second LED mounting substrate 32 can be a substrate for allowing the second LED light source 32*a* to be mounted on one surface thereof. The second LED mounting substrate 32 can be fixed by screwing to the second LED attached surface 31*a*1 of the seating portion 31*a* while the rear side 32*b* of the substrate 32 opposite to the side where the second LED light source 32*a* is mounted faces to or comes in contact with the second LED attached surface 31*a*1.

The second reflector 33 can be disposed in the illumination direction of the second LED light source 32*a* so as to reflect light emitted from the second LED light source 32*a*. With the configuration of the second reflector 33, the reflected light can pass through the lens portion 16*a* of the cover lens 16 so that a predetermined light distribution pattern such as a low beam light distribution pattern can be formed. The second reflector 33 can be a revolved parabolic reflector with its focus located at or near the second LED light source 32*a*, for example.

In the vehicle light 100 with the above configuration, the heat generated by the light emission from the LED light source 22*a* and/or 32*a* can propagate through the seating member 21*a*, 31*a*, the support member 21*b*, 31*b* to the housing 12 or the heat dissipation member 18 so that the heat can be dissipated into air through the housing 12 or the heat dissipation member 18.

In the vehicle light 100 with the above configuration, the first heat conduction member 21 and the second heat conduction member 31 can function as a heat transfer means and at the same time as a holding means for the LED mounting substrate 22, 23.

Accordingly, the first heat conduction member 21 and the second heat conduction member 31 can be fixed to the end portion 12*a* of the housing 12, so that the first and second LED light sources 22*a* and 32*a* can be disposed in place. In addition to this, the heat generated by the first and second LED light sources 22*a* and 32*a* emitting light can propagate through the first heat conduction member 21 and the second heat conduction member 31 to the housing 12. Due to the heat conduction property and dissipation performance of the housing 12, the heat dissipation from the vehicle light 100 can be further improved.

As described, the present exemplary embodiment can be configured such that the heat generated by the first LED light source 22*a* when emitting light can be transferred to the housing 12 or the heat dissipation member 18 by the action of the first support member 21*a* fixed to the first LED attached surface 21*a*1 at the one end 21*b*1 thereof (meaning that the one end 21*b*1 of the first support member 21*b* is connected with the light emission side of the first LED light source 22*a*). Accordingly, the heat can be effectively dissipated into air at the housing 12 or the heat dissipation member 18.

In the same manner, the present exemplary embodiment can be configured such that the heat generated by the second LED light source 32*a* emitting light can be transferred to the housing 12 or the heat dissipation member 18 by the action of the second support member 31*a* fixed to the second LED attached surface 31*a*1 at the one end 31*b*1 thereof (meaning that the one end 31*b*1 of the second support member 31*b* is connected with the light emission side of the second LED light source 32*a*). Accordingly, the heat can be effectively dissipated into air at the housing 12 or the heat dissipation member 18. Therefore, the first support member 21*b* and the second support member 31*b* can achieve the same or improved heat dissipation performance as that of the above-described conventional vehicle light. Furthermore, the conventional heat sink may be omitted as appropriate. Furthermore, the vehicle light 100 with the above configuration can have a smaller height than that of the conventional vehicle light by the height of the omitted heat sink. This configuration can improve the space utilization efficiency for a limited installation space within a vehicle body.

Accordingly, the vehicle light 100 with the above configuration can achieve the same or similar heat dissipation performance as that of the conventional vehicle light while having a smaller height than that of the conventional vehicle light, thereby improving the space utilization efficiency for the limited installation space of a vehicle body.

According to another aspect of the presently disclosed subject matter, it is possible to control the first LED light source 22*a* and the second LED light source 32*a* such that they are not simultaneously turned on. If the above control is performed, the amount of heat generated by turning on any one of the first and second LED light sources 22*a* and 32*a* can be suppressed to about half the amount of heat generated when both the first and second LED light sources 22*a* and 32*a* are simultaneously turned on. Accordingly, the heat dissipation member 18 such as a heat dissipation fin can be decreased in size or eliminated.

Figure 6:
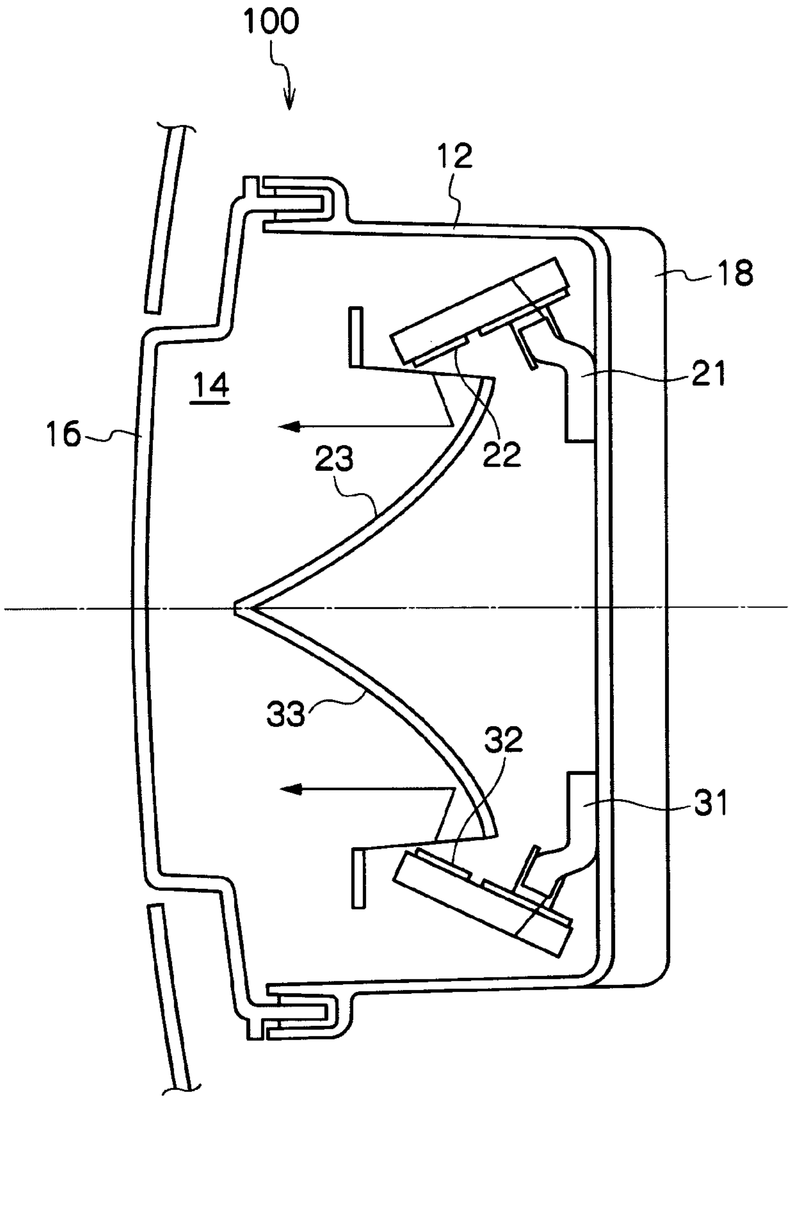
FIG. 6 is a cross sectional view of a modified example of the vehicle light of FIG. 3.

According to still another aspect of the presently disclosed subject matter, the first heat conduction member 21 and the second heat conduction member 31 can take a shape as shown in FIG. 6 in addition to the shape as shown in FIG. 4, or other appropriate shapes in accordance with the intended specification of a vehicle light.

In the above exemplary embodiment, the first reflector 23 can be configured to form a high beam light distribution pattern while the second reflector 33 can be configured to form a low beam light distribution pattern, to which the presently disclosed subject matter is not limited. In a modified example, the first reflector 23 can be configured to form a low beam light distribution pattern while the second reflector 33 can be configured to form a high beam light distribution pattern. In yet another modified example, the first reflector 23 and the second reflector 33 can form light distribution patterns other than the high beam or low beam light distribution pattern according to the intended specification of a vehicle light. It is also contemplated that the first heat conduction member 21(31) including the support member 21*b*(31*b*) and seating member 21*a*(31*a*) can be a single continuous structure made from a single material, or can be made in pieces that are attached via welds or separate attachment structures.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle light comprising:
- a housing;
- a cover lens attached to the housing to define a lighting chamber between the cover lens and the housing, the lighting chamber including a first space and a second space;
- a heat dissipation member attached to the housing;
- a first optical system disposed within the first space of the lighting chamber; and
- a second optical system disposed within the second space of the lighting chamber, wherein
- the first optical system includes
  - a first heat conduction member including a first LED attached surface facing a direction toward the second space, and a first support member, the first LED attached surface being located at one end of the support member, and at least one of the housing and the heat dissipation member being located at an other end of the support member,
  - a first LED light source attached to the first LED attached surface so as to have an illumination direction in the direction toward the second space, and
  - a first reflector disposed in the illumination direction of the first LED light source and configured to receive and reflect light when emitted from the first LED light source towards the cover lens so that reflected light from the first reflector passing through the cover lens forms a predetermined light distribution pattern, and
- the second optical system includes
  - a second heat conduction member including a second LED attached surface facing a direction toward the first space, and a second support member, the second LED attached surface being located at one end of the second support member, and one of the housing and the heat dissipation member being located at an other end of the second support member,
  - a second LED light source attached to the second LED attached surface so as to have an illumination direction directed in the direction toward the first space, and
  - a second reflector disposed in the illumination direction of the second LED light source and configured to receive and reflect light when emitted from the second LED light source towards the cover lens so that reflected light from the second reflector passing through the cover lens forms a predetermined light distribution pattern.

2. The vehicle light according to claim 1, wherein the lighting chamber is divided into an upper space and a lower space and the upper space corresponds to the first space and the lower space corresponds to the second space.

3. The vehicle light according to claim 2, wherein
- the first reflector is configured to reflect light emitted from the first LED light source towards the cover lens so that reflected light from the first reflector passing through the cover lens forms at least one of a high beam light distribution pattern and a low beam light distribution pattern, and
- the second reflector is configured to reflect light emitted from the second LED light source towards the cover lens so that reflected light from the second reflector passing through the cover lens forms at least one of the high beam light distribution pattern and the low beam light distribution pattern.

4. The vehicle light according to claim 3, further comprising a controller configured to control power to the first LED light source and the second LED light source such that the first LED light source and the second LED light source are not simultaneously turned on.

5. The vehicle light according to claim 2, further comprising a controller configured to control power to the first LED light source and the second LED light source such that the first LED light source and the second LED light source are not simultaneously turned on.

6. The vehicle light according to claim 1, wherein
- the first reflector is configured to reflect light emitted from the first LED light source towards the cover lens so that reflected light from the first reflector passing through the cover lens forms at least one of a high beam light distribution pattern and a low beam light distribution pattern, and
- the second reflector is configured to reflect light emitted from the second LED light source towards the cover lens so that reflected light from the second reflector passing through the cover lens forms at least one of the high beam light distribution pattern and the low beam light distribution pattern.

7. The vehicle light according to claim 6, further comprising a controller configured to control power to the first LED light source and the second LED light source such that the first LED light source and the second LED light source are not simultaneously turned on.

8. The vehicle light according to claim 1, further comprising a controller configured to control power to the first LED light source and the second LED light source such that the first LED light source and the second LED light source are not simultaneously turned on.

9. The vehicle light according to claim 1, wherein the first heat conduction member includes an elongate portion attached to at least one of the housing and the heat dissipation member, and the elongate portion is bent at one end and extends towards the support member, and terminates at an opposite end.

10. The vehicle light according to claim 9, wherein the one end of the elongate portion is located closer to the second space than the opposite end of the elongate portion.

11. The vehicle light according to claim 9, wherein the one end of the elongate portion is located further from the second space than the opposite end of the elongate portion.

12. The vehicle light according to claim 1, wherein the first LED attached surface is substantially planar, and the one end of the first support member extends from the planar first LED attached surface to the other end of the first support member which is attached to at least one of the heat dissipation member and the housing.

* * * * *